(12) United States Patent
Hapner

(10) Patent No.: US 8,567,431 B2
(45) Date of Patent: Oct. 29, 2013

(54) CHECK VALVE

(76) Inventor: Philip L. Hapner, Wabash, IN (US)

(*) Notice: Subject to any disclaimer, the term of this patent is extended or adjusted under 35 U.S.C. 154(b) by 185 days.

(21) Appl. No.: 13/231,014

(22) Filed: Sep. 13, 2011

(65) Prior Publication Data
US 2013/0061957 A1 Mar. 14, 2013

(51) Int. Cl.
*F16L 55/18* (2006.01)

(52) U.S. Cl.
USPC ............ 137/315.33; 137/315.16; 137/315.41; 137/327

(58) Field of Classification Search
USPC ............... 137/315.16, 315.33, 315.41, 327, 137/527.2, 527.8
See application file for complete search history.

(56) References Cited

U.S. PATENT DOCUMENTS

| | | | |
|---|---|---|---|
| 2,718,238 A | 10/1955 | Simko et al. | |
| 4,815,492 A | 3/1989 | Tedei | |
| 5,234,018 A | 8/1993 | Grachal et al. | |
| 5,775,365 A | 7/1998 | Hayden et al. | |
| 6,694,996 B2 * | 2/2004 | Funderburk | 137/15.18 |
| 7,757,706 B2 * | 7/2010 | Coscarella | 137/315.41 |

\* cited by examiner

*Primary Examiner* — John Rivell
*Assistant Examiner* — Kevin Barss
(74) *Attorney, Agent, or Firm* — Taylor IP, P.C.

(57) ABSTRACT

A check valve system including a plumbing assembly and a check valve assembly. The plumbing assembly has at least three portals including a first portal, a second portal and a third portal. The check valve assembly is positioned to block a fluid flow entering the second portal from flowing out of the first portal. The check valve assembly includes a securing mechanism positioned in the third portal.

15 Claims, 4 Drawing Sheets

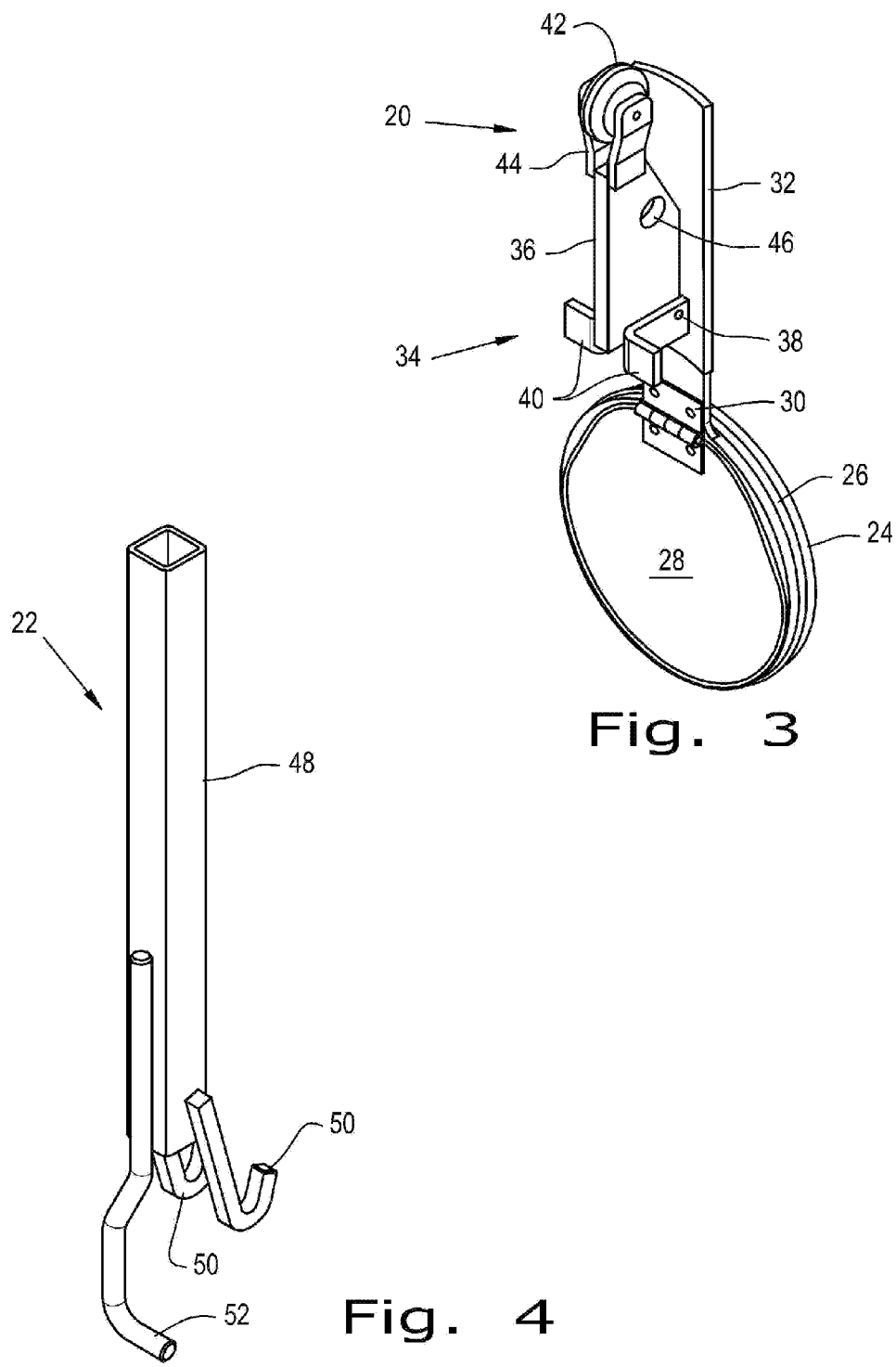

CHECK VALVE

BACKGROUND OF THE INVENTION

1. Field of the Invention

The present invention relates to plumbing, and, more particularly, to a check valve assembly added to an existing plumbing structure.

2. Description of the Related Art

A check valve is also known as a clack valve, a non-return valve or a one-way valve. It is a mechanical device which normally allows fluid to flow through it in only one direction. Typically, check valves are two port devices meaning they have two openings in the body, one for the fluid to enter and one for the fluid to leave through. Check valves efficiently work automatically and most are operated positionally allowing gravity to place a flapper proximate to a sealable opening in the event that a fluid tries to go in a direction causing the flapper to press against the sealing port thereby preventing fluid passing therethrough. Some check valves are spring operated so that they can operate in any orientation. The valves of the heart are essentially a check valve having an inlet and outlet for the heart ventricles.

A swing check valve or a tilting disk check valve is a valve in which a disk is a movable part used to block the flow of fluid therethrough. The disk or flapper swings on a hinge or trunnion either onto the seat to block reverse flow or off of the seat to allow a forward flow of fluid through the check valve.

Check valves are often utilized in commercial settings to prevent water from being sucked from a plumbing system in the event of a fire in which a fire truck pump is pumping water from a fire hydrant. Another use of a check valve is in the drainage lines of domestic and commercial properties where it is desirable to prevent the backflow of sewage and drainage water during a flood or other event that may cause a backflow. In many communities it is required in new installations to put a check valve in the exiting sewer line, typically outside of the building so that any backflow can be stopped outside of the building.

Unfortunately the prior art requires someone to dig up a sewer line which does not have a check valve in order to install the check valve. Another problem is that if the check valve fails it has to be dug up to be replaced.

What is needed in the art is a check valve that is easy to install into a current plumbing system, which can be maintained and replaced when necessary without requiring the digging up of the buried check valve.

SUMMARY OF THE INVENTION

The present invention in one form is directed to a check valve system including a plumbing assembly and a check valve assembly. The plumbing assembly has at least three portals including a first portal, a second portal and a third portal. The check valve assembly is positioned to block a fluid flow entering the second portal from flowing out of the first portal. The check valve assembly includes a securing mechanism positioned in the third portal.

The invention in another form is directed to a check valve including a ring, an arm extending from the ring, a securing mechanism connected to the arm and a flapper pivotally connected to the ring or the arm.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a perspective view of the check valve of FIGS. 1 and 2;

FIG. 4 is a perspective view of the tool used to install the check valve of FIGS. 1-3;

Corresponding reference characters indicate corresponding parts throughout the several views. The exemplifications set out herein illustrate one embodiments of the invention, in one form, and such exemplifications are not to be construed as limiting the scope of the invention in any manner.

DETAILED DESCRIPTION OF THE INVENTION

Figure 1:
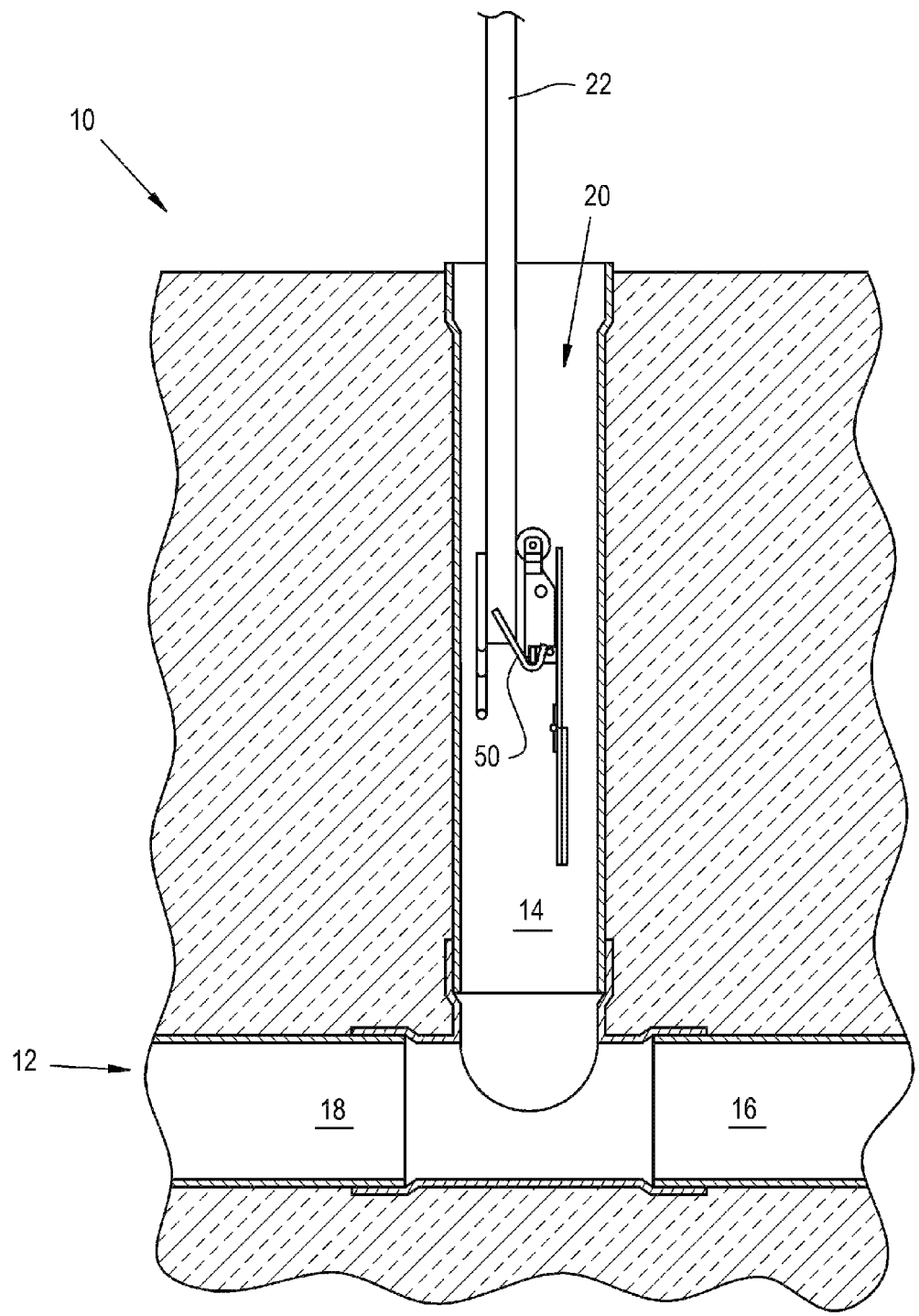
FIG. 1 is a partial cross section of a plumbing system showing the movement of an embodiment of the check valve of the present invention in the plumbing system.
Figure 2:
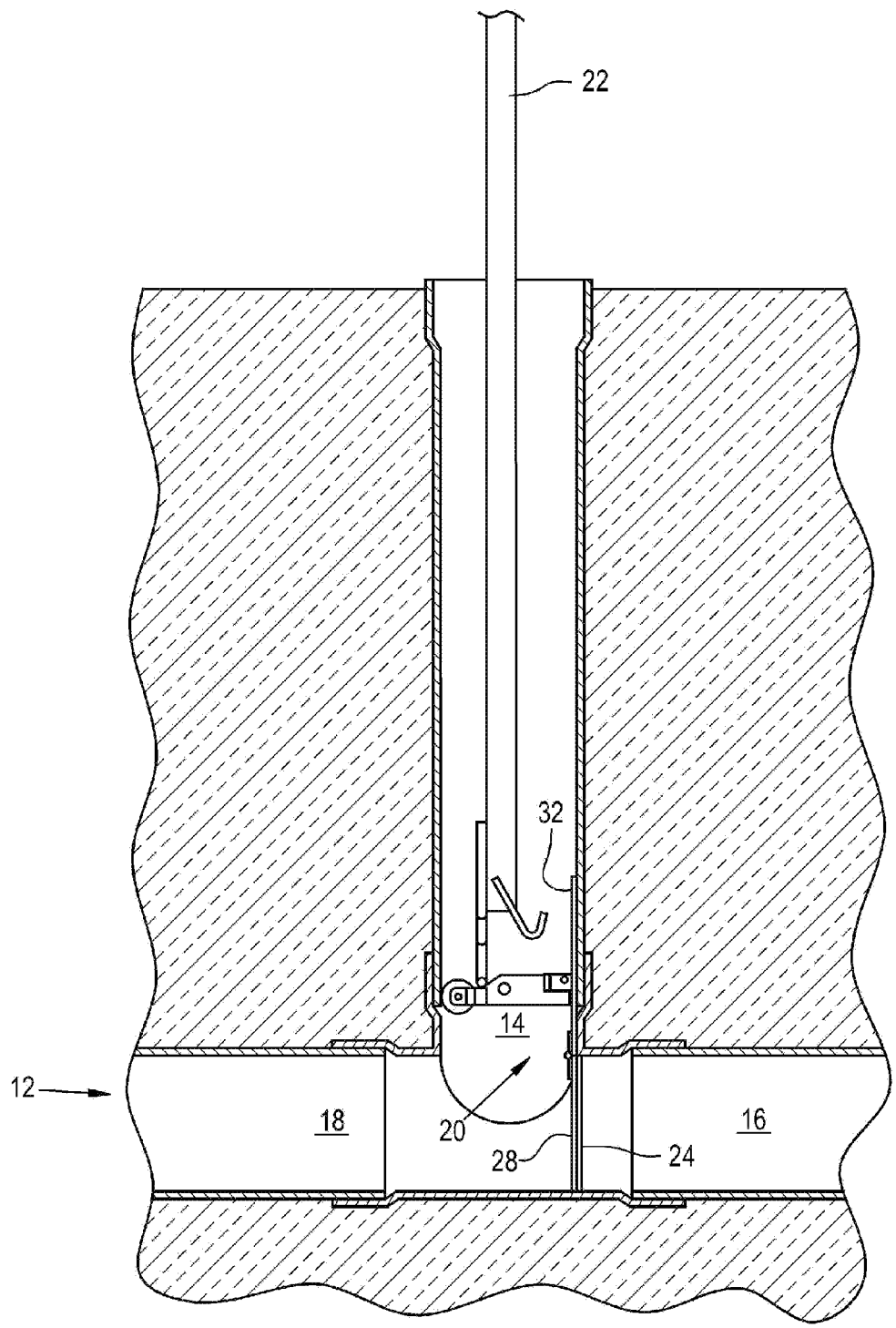
FIG. 2 is a partially cross sectioned side view of the plumbing system of FIG. 1 illustrating the installation of the check valve of FIG. 1.

Referring now to the drawings, and more particularly to FIGS. 1-3, there is illustrated a check valve system 10 including a plumbing assembly 12 having a portal 14, a portal 16 and a portal 18. Check valve system 10 additionally includes a check valve assembly 20 that is installed with an installation tool 22. Check valve assembly 20 is installed down an access pipe also known as a portal 14 from above the surface of the ground and it is positioned into a T plumbing fixture as shown in FIG. 2; installation tool 22 is then disconnected from check valve assembly 20 and it is used to secure check valve assembly 20 into portal 18.

Check valve assembly 20 includes a ring 24, an O-ring 26, a flapper 28, a hinge 30, an arm 32, and an over center device 34. Over center device 34, also referred to as a securing mechanism 34, has a latch arm 36, a pivot point 38, fingers 40, a roller 42, a yoke 44 and a hole 46 in latch arm 36. Securing mechanism 34 is used to secure check valve assembly 20 in portal 14 thereby allowing fluid flowing from portal 16 into portal 18 but blocking fluid flow from exiting portal 16. Ring 24 serves as a seat to flapper 28 and also as a seal to portal 16 when installed in plumbing assembly 12. O-ring 26 surrounds ring 24 and sets in a groove in ring 24 to more fully provide sealing of check valve assembly 20 as positioned in portal 16. Flapper 28 is connected to hinge 30 allowing flapper 28 to swing away from ring 24. Hinge 30 is also connected to either arm 32 or ring 24 thereby allowing pivotal movement of flapper 28. Flapper 28 may have slight oblate shape in order to accommodate the inside shape of the T-fitting in plumbing assembly 12 so that flapper 28 can more fully open within the constraint of the T-fitting. The shape of flapper 28 is accommodated by the inside profile of ring 24 to thereby prevent the flow of fluid in the wrong direction.

Arm 32 is connected to ring 24 and extends generally vertically when installed in plumbing assembly 12. Arm 32 may have a curved surface which accommodates the curved surface of portal 14. If portal 14 is the same diameter as portal 16 then the radius of curvature of arm 32 along the outer side will be substantially similar to the radius of curvature of ring 24.

Securing mechanism 34 also here shown as an over center device 34 includes the latch arm 36 that is pivotally connected at pivot point 38 to fingers 40. Fingers 40 have a dual purpose in the installation process and here can be thought of as the parts extending from arm 32 to allow for convenient pivoting of a latch arm 36 about pivot point 38. Pivot point 38 is selected to co-act with the length of latch arm 36 so that when latch arm 36 is in position the over-center nature of latch arm 36, as it is swung contacts the inside of arm 32, roller 42 that extends from yoke 44 engages an opposite wall of portal 14 thereby securing check valve assembly 20 in portal 14 to prevent the backflow of fluid into portal 16. The resiliency of roller 42 allows over center device 34 to be easily installed and latched and then later removed without compromising the positioning and strength of check valve assembly 20 in portal 14.

Installation tool 22 includes a pole 48, hooks 50 and a removal hook 52. Pole 48 may have a handle or other mechanism along a top portion to accommodate the user. Alternatively, installation tool 22 may have a moveable engagement apparatus to securely hold, install and remove check valve assembly 20 to/from plumbing assembly 12. As shown in FIG. 1, check valve assembly 20 is being lowered in through portal 14 with hooks 50 interacting with fingers 40 to properly support and position check valve assembly 20. As check valve assembly 20 is pushed back into portal 16, installation tool 22 is lowered thereby disengaging hooks 50 from fingers 40 and removal hook 52 is used for a dual purpose to push down latch arm 36 as shown in FIG. 2 thereby securing check valve assembly 20 in portal 14 and portal 16.

Figure 5:
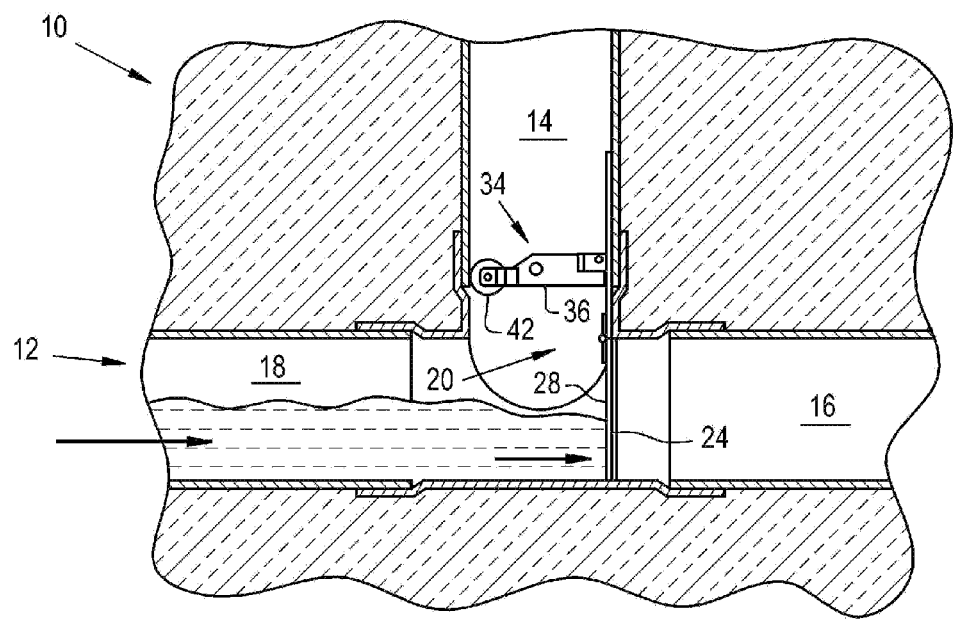
FIG. 5 is a partially sectioned side view of check valve of FIGS. 1-3 illustrating the function of the check valve in the plumbing system to a reverse flow of fluid.
Figure 6:
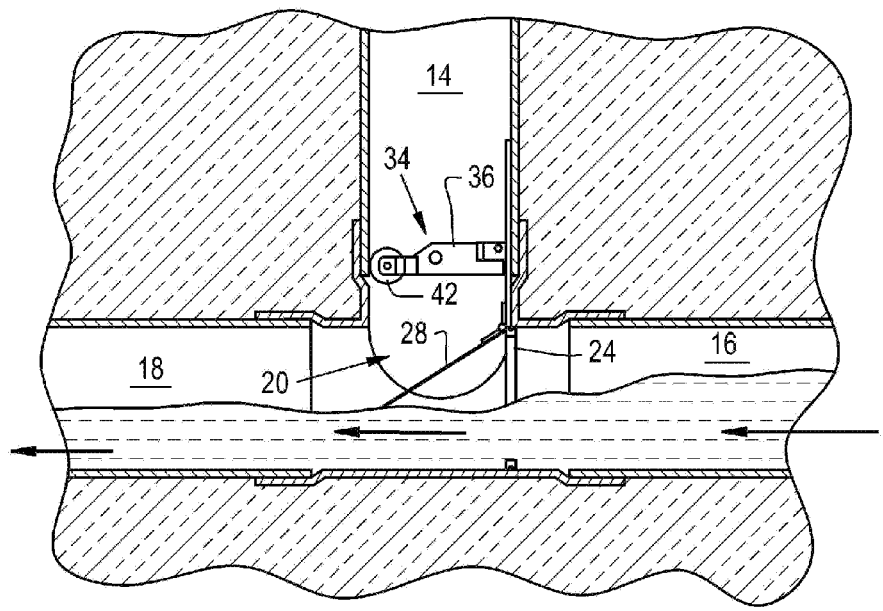
FIG. 6 is a partially sectioned side view of the check valve of FIGS. 1-3 and 5 illustrating a forward flow of fluid through the check valve.

Now, additionally referring to FIGS. 5 and 6 there is shown the effects of flow with check valve assembly 20 properly positioned in plumbing assembly 12. In FIG. 5 reverse flow of fluid is prevented if the flow is attempting to move to the right. In FIG. 6 flow from the left is allowed, with flapper 28 hinging outwardly, away from ring 24 as the fluid passes beneath flapper 28.

In the event valve assembly 20 requires maintenance or it is desirable to remove check valve assembly 20 then removal hook 52 is inserted through hole 46 and latch arm 36 is pulled thereby releasing check valve assembly 20 from portal 16 and check valve assembly 20 is pulled out through portal 14 for maintenance and/or replacement.

Although not illustrated at the top of portal 14 a removable sealing cap may be placed therein so that in the event backflow occurs, as shown in FIG. 5, the backflow will not extend up above the ground. Advantageously the present invention allows for the retrofitting of legacy plumbing systems placing a check valve in an easy non-invasive manner by using the clean out plumbing access that often is outside the foundation of a house. Another advantage of the present invention is that it allows for the easy maintenance of check valve assembly 20 to ensure proper operation of check valve assembly 20 in its installation. Another advantage of the present invention is that securing mechanism 34 does not restrict fluid flow and that typically fluid flows from portal 16 through portal 18 and does not flow up portal 14. Portal 14 being a cleanout or observation portal. In the event a cleaning device needs to be inserted down portal 14, check valve assembly 20 can be removed easily to preclude the need for digging up the T fixture.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A check valve system, comprising:
   a plumbing assembly having at least three portals, including a first portal, a second portal and a third portal; and
   a check valve assembly positioned to block a fluid flow entering said second portal from flowing out of said first portal, said check valve assembly including a securing mechanism positioned in said third portal, said securing mechanism includes an over-center device that contacts a side of said third portal when said check valve assembly is positioned in said plumbing assembly.

2. The check valve system of claim 1, wherein said check valve assembly includes:
   a ring;
   an arm extending from said ring; and
   a flapper pivotally connected to one of said ring and said arm, said over-center device being pivotally attached to said arm.

3. The check valve system of claim 2, wherein said over-center device includes a roller on an end of said over-center device opposite of an end that is pivotally attached to said arm.

4. The check valve system of claim 2, wherein said arm has a curved side to correspond to a curvature of said third portal.

5. The check valve system of claim 4, wherein said curved side of said arm has a substantially similar radius as a radius of said ring.

6. The check valve system of claim 2, wherein said check valve assembly additionally includes an o-ring, said ring having a circumferential groove accommodating said o-ring, said o-ring being in contact with a portion of said first portal.

7. A check valve system, comprising:
   a plumbing assembly having at least three portals, including a first portal, a second portal and a third portal; and
   a check valve assembly positioned to block a fluid flow entering said second portal from flowing out of said first portal, said check valve assembly including a securing mechanism positioned in said third portal, said check valve assembly further includes at least one protruding angled finger configured to engage an installation tool while said check valve assembly is lowered through said third portal, said securing mechanism includes a hole by which said tool can engage said securing mechanism to thereby disengage said securing mechanism from said third portal, said at least one protruding angled finger includes a first angled protruding finger and a second angled protruding finger, said securing mechanism including a latch arm pivotally connected to at least one of said first angled protruding finger and said second angled protruding finger.

8. A check valve, comprising:
   a ring;
   an arm extending from said ring;
   a securing mechanism connected to said arm; and
   a flapper pivotally connected to one of said ring and said arm, said check valve is configured to be positioned in a plumbing assembly having at least three portals, including a first portal, a second portal and a third portal, the check valve being positioned to block a fluid flow entering said second portal from flowing out of said first portal, said securing mechanism being positioned in said third portal, said securing mechanism includes an over-center device that contacts a side of said third portal when said check valve is positioned in said plumbing assembly.

9. The check valve of claim 8, wherein said over-center device includes a roller on an end of said over-center device opposite of an end that is pivotally attached to said arm.

10. The check valve of claim 8, wherein said arm has a curved side to correspond to a curvature of said third portal.

11. The check valve of claim 10, wherein said curved side of said arm has a substantially similar radius as a radius of said ring.

12. The check valve of claim 8, further comprising an o-ring, said ring having a circumferential groove accommodating said o-ring, said o-ring being in contact with a portion of said first portal when the check valve is installed in said plumbing assembly.

13. The check valve of claim 8, further comprising at least one protruding angled finger configured to engage an installation tool while said check valve assembly is lowered through said third portal.

14. The check valve of claim 13, wherein said securing mechanism includes a hole by which said tool can engage said securing mechanism to thereby disengage said securing mechanism from said third portal.

15. The check valve of claim 14, wherein said at least one protruding angled finger includes a first angled protruding finger and a second angled protruding finger, said over-center device being pivotally connected to at least one of said first angled protruding finger and said second angled protruding finger.

* * * * *